United States Patent
Keshavaraj

(10) Patent No.: US 6,695,346 B1
(45) Date of Patent: *Feb. 24, 2004

(54) POLYGON-SHAPED AIR BAG WITH LAPPING SEAM AREA

(75) Inventor: Ramesh Keshavaraj, LaGrange, GA (US)

(73) Assignee: Milliken & Company, Spartanburg, SC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/298,635

(22) Filed: Apr. 23, 1999

(51) Int. Cl.$^7$ ................................................ B60R 21/16
(52) U.S. Cl. .................................. 280/743.1; 280/728.1
(58) Field of Search ........................... 280/743.1, 728.1, 280/731; 112/423, 426; 2/69, 158

(56) References Cited

U.S. PATENT DOCUMENTS

| | | | |
|---|---|---|---|
| 2,335,292 A | 11/1943 | Messenger | 164/17 |
| 3,744,191 A | 7/1973 | Bird | 52/2 |
| 3,960,386 A | 6/1976 | Wallsten | 280/731 |
| 3,970,328 A | 7/1976 | Wallsten | 280/731 |
| 4,077,588 A | 3/1978 | Hurst | 244/31 |
| 4,119,050 A | 10/1978 | Klein | 113/121 |
| 4,244,996 A * | 1/1981 | Maloney | 112/423 |
| 4,603,571 A | 8/1986 | Wessels | 72/349 |
| 5,358,273 A * | 10/1994 | Onishi et al. | 280/743.1 |
| 5,454,589 A | 10/1995 | Bosio et al. | 280/729 |
| 5,524,926 A * | 6/1996 | Hirai et al. | 280/743.1 |
| 5,547,218 A * | 8/1996 | Kuretake et al. | 280/743.1 |
| 5,593,754 A * | 1/1997 | Blauer et al. | 428/131 |
| 5,707,711 A * | 1/1998 | Kitamura | 428/193 |
| 5,720,234 A | 2/1998 | Hammer | 112/475.08 |
| 5,865,464 A | 2/1999 | Kanuma et al. | 280/743.1 |
| 5,906,530 A * | 5/1999 | Lindsey | 446/85 |
| 5,957,486 A | 9/1999 | Taguchi et al. | 280/729 |
| 5,975,571 A | 11/1999 | Ford et al. | 280/743.1 |
| 6,142,520 A | 11/2000 | Iino et al. | 280/743.1 |

* cited by examiner

Primary Examiner—Brian L. Johnson
Assistant Examiner—Hau Phan
(74) Attorney, Agent, or Firm—Terry T. Moyer; George M. Fisher

(57) ABSTRACT

A polygon-shaped air bag for use in vehicle restraint system is constructed from two panels of different sizes, each of which is in the form of an n-sided equiangular polygon, where n may be five or greater but is preferably six or eight. The panels are cut from a blank which is comprised of fabric or other suitable material, then superimposed in concentric relation onto one another with the perimeter portions of the larger panel folded and adhesively secured to the corresponding perimeter portions of the smaller panel for the purpose of distributing the stresses of inflation and impact across an area wider than the conventional equatorial seam and transferring such stresses into shearing, rather than tensile forces. In a preferred embodiment, the width of the overlapping panel portion is equal to the distance between an edge of the smaller panel and a corresponding parallel edge of the larger panel, where the panels are superimposed in concentric relation to one another.

17 Claims, 5 Drawing Sheets

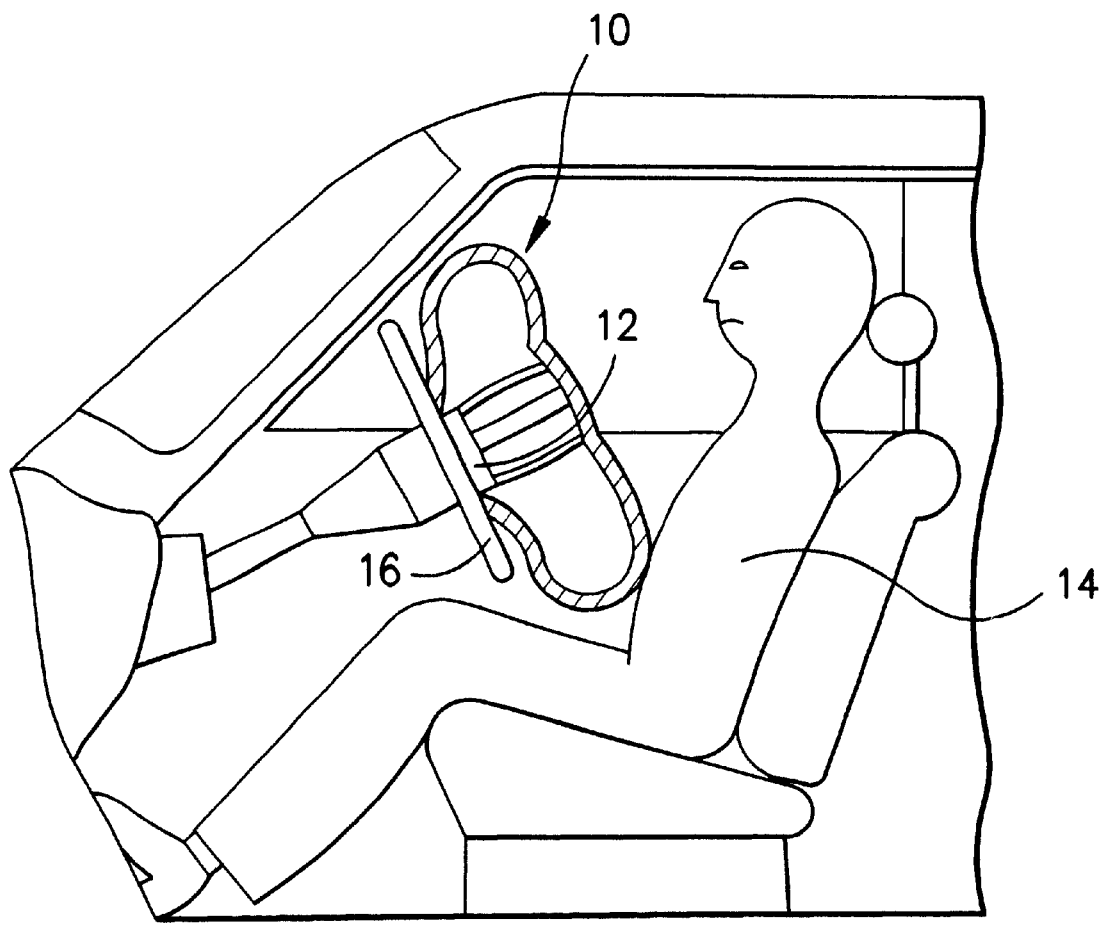
FIG. −1−

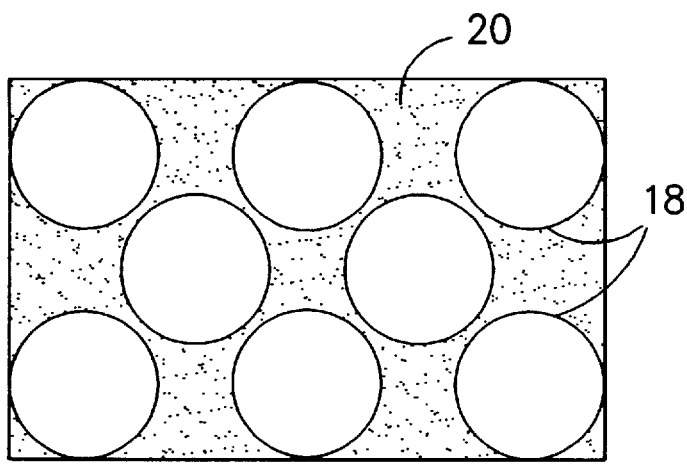
FIG. -2-
PRIOR ART
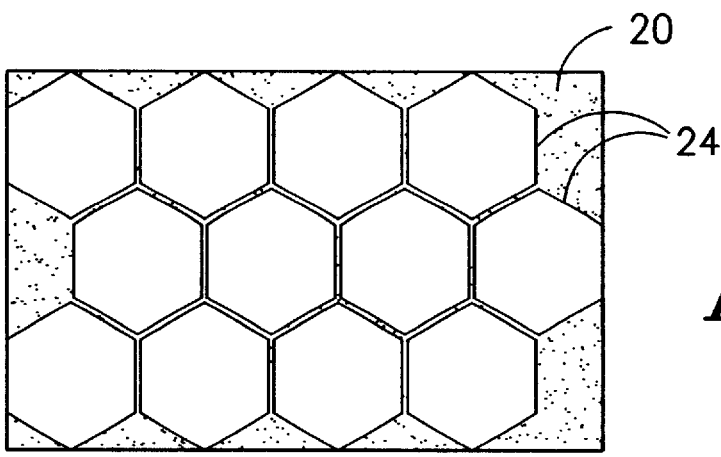
FIG. -3-
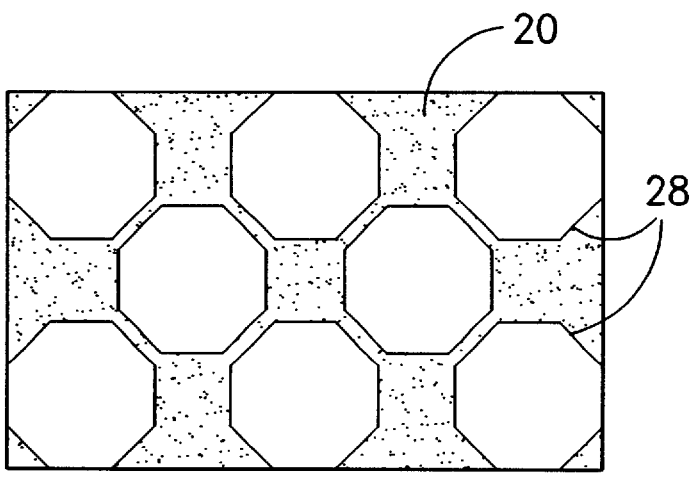
FIG. -4-

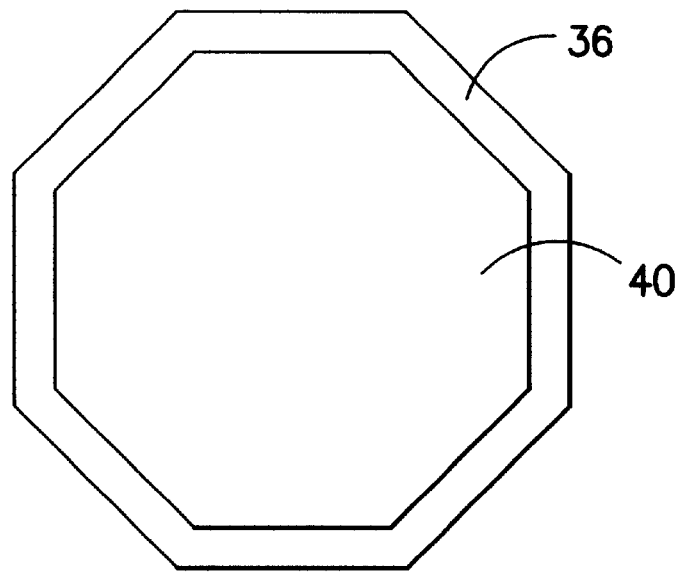
FIG. -5-
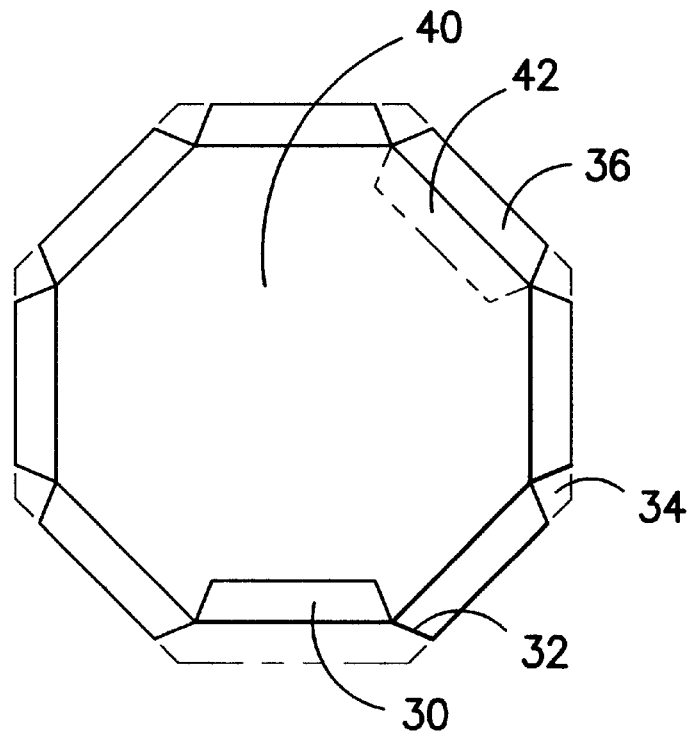
FIG. -6-

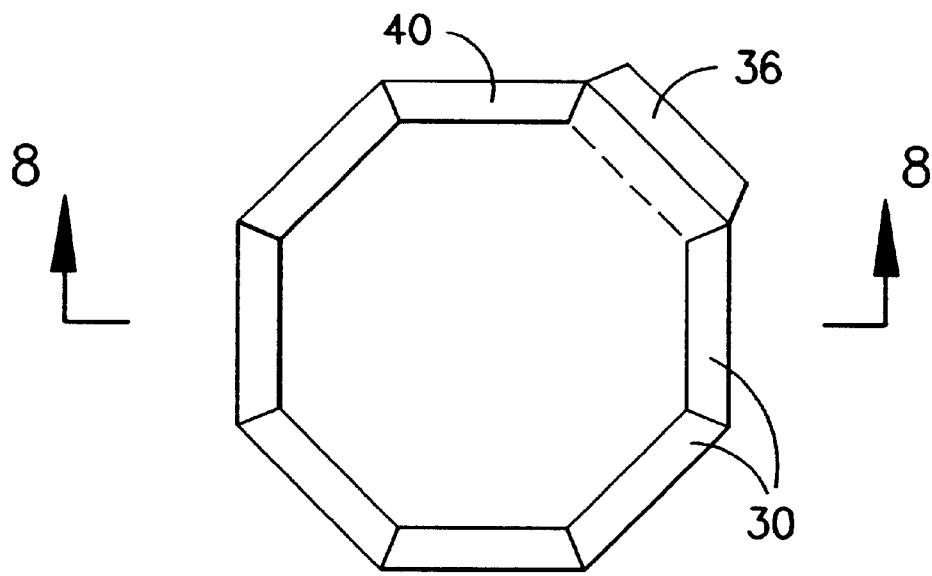
FIG. -7-
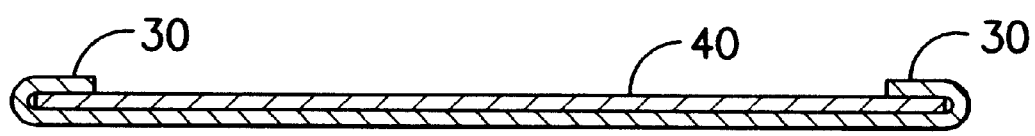
FIG. -8A-
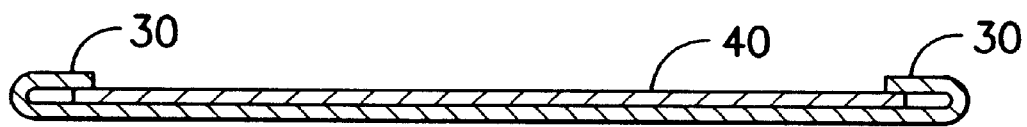
FIG. -8B-

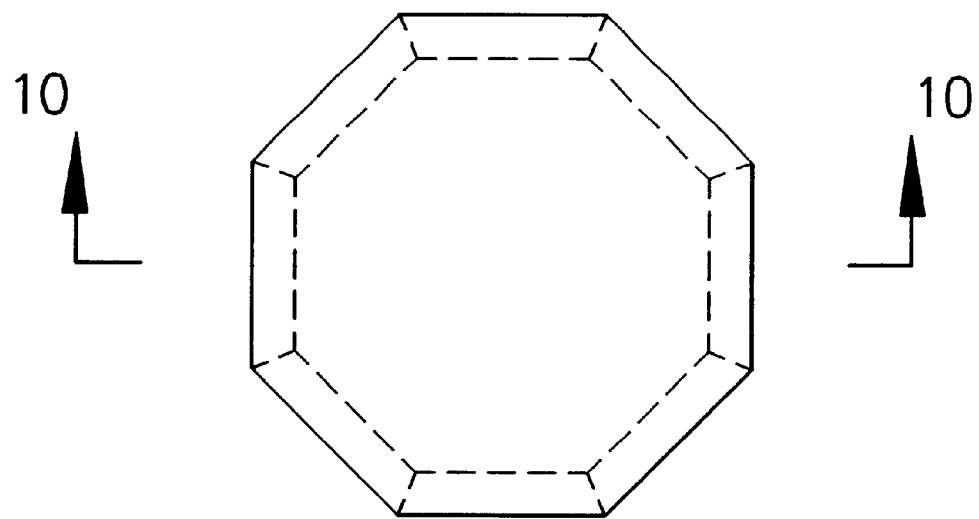
FIG. -9-
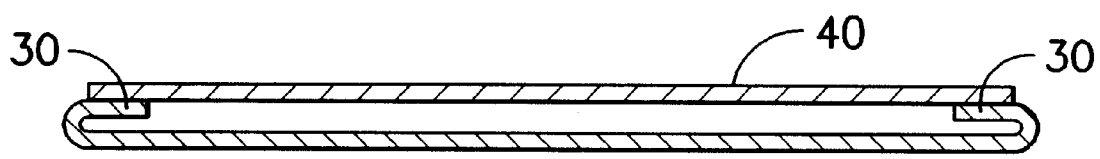
FIG. -10-

POLYGON-SHAPED AIR BAG WITH LAPPING SEAM AREA

FIELD OF THE INVENTION

The present invention relates generally to inflatable cushions used in vehicle occupant restraint systems. More particularly, this invention relates to a cushion constructed from two opposed fabric panels of different sizes, each of which is in the shape of the same polygon. The panels are joined along their respective perimeter portions by folding the perimeter portions of the larger panel to create lapped panel portions that are secured to the perimeter portions of the smaller panel, preferably by chemical securing means. In a preferred embodiment, certain perimeter portions of the larger polygon panel are removed to produce a smooth lapped area comprising a single layer of overlapped or underlapped fabric without multiple folded layers formed by excess fabric.

BACKGROUND OF THE INVENTION

An inflatable restraint cushion, or air bag, plays an important role in protecting the occupants of a vehicle from injury due to collision against the car body. Typically, the air bag is disposed within a supporting structure such as a dash panel, steering wheel, door panel, or other fixed portion of a car body in opposed or adjacent relationship to a seat in the vehicle. When inflated rapidly by the pressure of a reaction gas released from an inflator during a collision, the air bag serves as a protective barrier between the vehicle occupant and the steering wheel or other portion of the vehicle against which the occupant might otherwise be thrown.

Air bags have been used in the past to protect both the vehicle operator and vehicle passengers. Systems for the protection of the vehicle operator are typically mounted in the steering column of the vehicle and utilize cushion constructions that deploy directly towards the driver. These "driver-side" air bags can be of a relatively simple configuration in that they function over a relatively small, well-defined area between the driver and the steering column.

As used herein, it is intended that the following terms be defined as indicated: A "polygon" is a plane geometric figure having n sides and n vertices. An equiangular polygon is one in which all the angles comprising the vertices are equal. An equilateral polygon is one in which all sides are of equal length. A regular polygon is one that is both equiangular and equilateral. A convex polygon is one in which no side, if extended, will enter the polygon. Unless otherwise specified, the term "polygon" shall refer to a convex equiangular polygon. The term "fabric" shall be used in a broad sense to describe any woven or non-woven fabric, as well as any film, polymer, combinations or composites thereof, or other material from which the individual panels comprising an air bag may be constructed. Additionally, reference to the use of adhesives shall refer to the use of chemical, thermal, or other bonding or fusing methods.

Typically, air bags designed for the protection of vehicle drivers are circular or substantially circular in shape when viewed from the front or the back. Such circular air bags are constructed by superimposing, aligning, and seaming or joining of two similarly-dimensioned circular panels along their respective coincident perimeter edges, thereby forming an equatorial seam, after such circular panels have been separately cut from a blank of suitable air bag fabric. A problem with conventional circular air bags is that, upon inflation and impact, these equatorial seams are exposed to substantial tensile stresses that can cause failure of the seam. This invention addresses the problem of the possible failure of a conventional equatorial seam subjected to such tensile stresses.

To better understand this invention, it is necessary to define the terms used herein to describe the various aspects of its construction. In accordance with the teachings of this invention, two fabric panels of different size are cut from a fabric blank and attached to each other around their respective perimeters. For purposes of discussion herein, the panel area nearest the edge or perimeter of each panel shall be termed the perimeter border area of the panel.

The term "fold" is intended to mean a bending over, with or without the formation of a crease. If at least a portion of the perimeter border area of the larger panel is folded over the corresponding perimeter border area of the smaller panel, thereby enclosing and concealing the cut edge of the smaller panel, it is said that an overlap is formed. If at least a portion of the perimeter border area of the larger panel is folded under the corresponding perimeter border area of the smaller panel, thereby leaving the edge of the smaller panel exposed, it is said that an underlap is formed. The term "lapped" is intended to mean either overlapped or underlapped. The term "lapped panel portion" or "lapped panel area" or "lapped area" is intended to mean the perimeter border area of the smaller panel that is lapped by the larger panel. The secured area is the area of the lapped panel portion, preferably substantially all of the lapped panel portion, over which the perimeter border area of the larger and smaller panels have been joined or attached by adhesive means.

The term "fold width" is intended to have its common meaning as applied to the flap or folded portion of the larger panel, and may be more technically defined as the radial distance, prior to folding, between the perimeter of a given side of the n-sided polygon comprising the larger panel and the corresponding fold axis on that same side. Fold width should be distinguished from "fold length," which would be measured parallel to the edge of the polygon (and would generally be equal to the length of the side n of the n-sided polygon). The term "concentric" or "superimposed" refers to the arrangement of the panels, such that the geometric centers of the two panels are aligned and coincident, and the corresponding n sides of the two polygons comprising the panels are parallel.

The air bag of the present invention may be produced by superimposing two polygon-shaped panels of differing size, folding at least portions of the perimeter border area of the larger panel over or under corresponding perimeter border areas of the smaller panel to create lapped panel portions, and securing together the lapped panel portions, preferably by adhesive means. It should be noted that the lapped area may comprise substantially the entire width of the folded panel portion, or merely some part thereof, as will be described herein.

Attachment of the perimeter portions of the panels using suitable adhesive means as are known by those skilled in the art eliminates the need for sewing the air bag as part of the assembly procedure. Sewing without substantial seam lapping typically produces a narrow seam, with discrete points of attachment, over which the substantial stresses of inflation and impact are manifested as tensile forces. Adhesive seaming with substantial seam lapping of the kind described herein produces a relatively wide seam area with a relatively continuous area of attachment, over which the substantial stresses of inflation and impact are manifested as shear forces. In so doing, a common tendency of adhesive seaming to fail when subjected to peeling forces may be avoided, and a fully functional and reliable seam may be constructed with little chance of rupture or leakage.

In addition, while conventional circular air bags are functionally effective, the circular shape of the front and back fabric sections from which the air bags are constructed does not lend itself to the efficient utilization of fabric during the manufacturing process. Specifically, the arrangement of these circular pieces on a given blank of air bag fabric does not result in efficient fabric utilization or yield. It has been found that fabric utilization can be significantly improved by substituting polygon shapes, and particularly equiangular polygons having at least five sides, for the circular-shaped panels of the prior art. The polygon shapes can be placed in either adjoining or close proximity to one another on the fabric blank from which they are cut to provide common (coincident) or nearly common (closely adjacent) sides or cut edges, thus minimizing fabric waste and cost and providing a useful advancement over the present art. Because the face and rear portions of the air bag of the present invention are constructed from polygon-shaped panels of different size, separate blanks (or separate areas of the same blank) for each panel size may be used so that all panels of a given size can be most economically arranged on a given area in accordance with the teachings herein.

The advantages, therefore, of the present invention include increased seam strength and reliability due to the chemical seaming of the lapped panel portions, and better fabric utilization due to the alignment of polygon shapes on a fabric blank. Accordingly, this invention is believed to represent a useful advancement over the present art.

SUMMARY OF THE INVENTION

In view of the foregoing, it is an object of this invention to provide a simple inflatable cushion restraint or air bag that is fabricated without sewing and that may be used in a system for restraining a vehicle occupant in the event of a collision, as well as a related process for manufacturing such an air bag.

It is another object of this invention to provide a vehicle occupant restraint cushion or air bag that can be formed by lapping and securing the perimeter portions of two polygonal fabric panels of different size in a way that distributes the stresses of inflation and impact within an area larger than that associated with a conventional sewn equatorial seam.

In accordance with one aspect of the present invention, the cushion or air bag of the instant invention comprises a first polygon-shaped fabric panel, a somewhat differently sized second fabric panel (larger or smaller) that has the same polygon shape and that is superimposed onto said first panel in concentric relation such that the respective outside edges of the two panels are parallel, and gas inlet and outlet means for introducing and expelling an inflating medium within the cavity formed by the first and second fabric panels. In a preferred embodiment, first and second fabric panels are each comprised of a panel of fabric in the shape of the same n-sided equiangular polygon, having a perimeter comprised of a sequence of linear segments separated by vertices or corner portions disposed therebetween, where n is at least five, i.e., both of the panels are configured in the shape of the same equiangular pentagon, hexagon, heptagon, octagon, or the like. The two panels are of different size, so that, when superimposed to form a flat, layered structure with coincident centers, the perimeter border arear of the larger panel extends laterally beyond the perimeter border area of the smaller panel. The seam area is constructed by folding, along each of the n sides, the perimeter border area of the larger panel over or under the corresponding perimeter border area of the smaller panel. The resulting lapped area is then adhesively joined by chemical, thermal, or other means. It is contemplated that additional layers of fabric or other materials may be interposed or placed alongside one or both of the layers, either fully or partially, as the design specifications may dictate. Upon appropriate inflation, the resulting flat cavity forms a restraint cushion or air bag that, when incorporated into an appropriate air bag system, is suitable for protecting the occupants of a vehicle involved in a collision.

In accordance with another aspect of the present invention, a method for forming the inflatable cushion of the present invention is provided. Where two separate panels are used, the method comprises the steps of: (a) cutting a first fabric panel in a chosen n-sided polygon shape; (b) cutting a second fabric panel in the same chosen n-sided polygon shape, but of a size that is somewhat larger or smaller than the first fabric panel; (c) superimposing the first and second panels in concentric relationship, thereby forming a two-layered structure in which portions of the perimeter border areas of the larger panel laterally extend beyond the perimeter border areas of the smaller panel; (d) folding, along each of the n sides, at least a portion of the extended perimeter border areas of the larger panel over or under the corresponding perimeter border areas of the smaller panel, thereby forming a lapped panel portion; and (e) adhesively joining together the two overlapping or underlapping layers comprising the lapped panel portion along each of the n sides of the polygon.

Since the panels are of different size, radial cuts may be made along the edge of the larger panel to accommodate the folding of the lapped panel portions of the larger panel. In a preferred embodiment, a small triangular-shaped section of fabric may be removed from corner locations along the perimeter of the larger panel to avoid the folding or bunching of excess fabric. Both the cutting and joining operations may be achieved by manual or automated methods known by those skilled in the art. As is conventionally done, suitable holes may be cut in the rear panel to form gas inlet means, gas outlet means, or for other purposes; and various other structural devices or reinforcements may be incorporated into the design of the air bag.

BRIEF DESCRIPTION OF THE DRAWINGS

These and other features of the invention will become more apparent from the following detailed description of the preferred embodiments of the invention, when taken along with the accompanying drawings in which:

FIG. 1 shows a cut-away view of an inflatable cushion restraint, such as that of the present invention, in deployment between the driver and the steering column.

FIG. 2 shows an arrangement of circular panels on a fabric blank, exemplifying the prior art.

FIG. 3 shows an arrangement on a fabric blank of single panels, each hexagon-shaped. In accordance with the teachings herein.

FIG. 4 shows an arrangement on a fabric blank of songle panels, each octagon-shaped, in accordance with the teachings herein.

FIG. 5 shows an arrangement of two octagon-shaped panels of different size that are superimposed in concentric relation to one another in accordance with the teachings herein.

FIG. 6 shows two octagonal panels, arranged as in FIG. 5, wherein the larger panel has trapezoid-shaped panel portions created by removing the corner portions of the perimeter border area of the larger panel, and wherein one of the trapezoidal-shaped panel portions has been folded over the corresponding perimeter border area of the smaller panel.

FIG. 7 shows the panel arrangement of FIG. 6 following the folding and securing of all but one of the trapezoidal-shaped panel portions. The section line refers to the views shown in FIGS. 8A and 8B.

FIG. 8A shows a cross-sectional view of an uninflated air bag cushion of the present invention, such as could be constructed from the panel arrangement of FIG. 7, showing an overlap, as defined herein, wherein substantially all of the folded portion of the larger panel is lapped onto the overside of the smaller panel, thereby maximizing the lapped panel portion, as defined herein.

FIG. 8B shows a cross-sectional view of an uninflated air bag cushion of the present invention, such as could be constructed from the panel arrangement of FIG. 7, showing an overlap, as defined herein, wherein only a portion of the folded portion of the larger panel is lapped onto the overside of the smaller panel, thereby reducing the lapped panel portion depicted in FIG. 8A.

FIG. 9 shows an uninflated air bag cushion of the present invention having an underlapped seam area, wherein the folded portion of the larger panel is secured to the underside of the smaller panel, such that the lapped panel portions are hidden from view.

FIG. 10 shows a cross-sectional view of the uninflated air bag cushion of FIG. 9, showing an underlap, as defined herein, wherein the folded portion of the larger panel is secured to the underside of the smaller panel.

DETAILED DESCRIPTION

Turning now to the drawings, FIG. 1 shows generally an air bag 10 for use in conjunction with an air bag system comprising an inflator 12 to protect a vehicle driver 14 from impacting against a steering wheel 16 in the event of a collision. The air bag 10 may be stored conventionally, i.e., in folded form within the central column of steering wheel 16, prior to deployment. For purposes of exposition, the panel that faces the driver following inflation shall be referred to as the front or face panel, and the panel that, following deployment, faces the steering wheel of the vehicle shall be referred to as the back or rear panel. As will be appreciated by those of skill in the art, suitable holes may be cut in the rear panel for the introduction and venting of the inflation media, with the location and size of the inflator and vent holes being determined by conventional design criteria. Furthermore, hub configurations, including size and number of doublers, heat shields, reinforcements, or other features known to those skilled in the art may be used in accordance with conventional teachings.

The air bag 10 preferably is formed from the superposition of a face panel and a similarly shaped rear panel, each of which is shaped in the form of a polygon, preferably having at least five sides, and more preferably having six or eight sides. This is in contrast to driver's side air bags that are conventionally formed from panels that are circular in shape. As shown in FIG. 2, the use of circular panels results in significant fabric waste because of the limited degree to which a plurality of circular panels 18 can be arranged in close proximity on a fabric blank 20, and otherwise referred to as inter-panel fabric. Fabric blank waste (defined herein as the fabric between the indicated panel cutout areas within fabric blank 20) that is associated with using circular panels results in a significantly higher cost for each circular finished air bag.

The fabric blank 20 may be formed from any material suitable for use in an air bag. Woven fabric constructions of nylon, polyester, or other suitable natural or polymeric materials as are well known to those skilled in the art may be preferred. Fabrics formed from nylon 6,6 may be particularly preferred. The fabrics may be coated or uncoated, and the face panel and rear panel may be cut from different types of fabric, provided their relative size (one larger than the other) and shape (same polygonal shape) are in accordance with the teachings herein. By way of example only and not limitation, the face panel may be a coated or very low permeability uncoated fabric while the rear panel is a higher permeability material so as to facilitate venting during impact.

To form the air bag 10 in accordance with the teachings of this invention, a face panel and a rear panel of different size but similar polygonal shape are separately inscribed within respective areas of a suitable fabric blank 20, as shown in FIGS. 3 and 4. FIG. 3 shows the arrangement of same-size hexagon-shaped panels 24 on a fabric blank 20, representing, for example, all face panels. FIG. 4 shows a similar arrangement of same-size octagon-shaped panels 28 on a fabric blank 20. A second fabric blank would carry a similar arrangement of somewhat larger hexagon- or octagonshaped panels, from which, for example, the rear panels may be constructed. Hexagon-shaped panels 24 may be preferred because they can be most closely aligned on the fabric blank 20, resulting in the smallest amount of fabric waste per panel, although in some cases, the fabric between adjacent panels on the blank may be used for fabricating doublers or other necessary parts, thereby making use of otherwise wasted areas of the fabric blank. Panels having seven, nine, ten, or larger number of sides may be employed, as design specifications dictate. However, it is clear that, generally as the number of sides increases beyond, say, ten, the more the resulting cut panel tends to resemble a circle, and some of the advantages of the instant invention become correspondingly diminished. For this reason, n is preferably an integer that is at least five and less than eleven; and is most preferably six or eight.

It should be understood that, because the face and rear panels are of different sizes, all similarly-sized face panels and all similarly-sized rear panels should be grouped separately in different portions of the fabric blank, or should be grouped on separate blanks, to allow for the efficient geometric placement of same-size panels on the blank, as indicated in the Figures. It also should be understood that if the face and rear panels are to be made from different fabric materials, separate blanks 20, each comprised of the desired respective fabric, would be used to form multiple face or rear panels, respectively arranged as indicated in the Figures.

Following the cutting of two differently-sized but similarly-shaped panels that will become the face and rear panels of the fabricated air bag, the two panels may be superimposed in concentric relation, so that the layered panels lie flat and the respective cut edges of each panel are parallel to the corresponding cut edges of the other panel, as indicated in FIG. 5 where the smaller panel 40 is superimposed on the larger panel 36. At least a portion of each of the perimeter border areas of the larger panel that radially extend outwardly from the corresponding perimeter border areas of the smaller panel are then folded over or under the corresponding perimeter border areas of the smaller panel. Finally, the panels are joined in the lapped area by adhesive means.

In a particularly preferred embodiment shown in FIG. 6, outwardly extending oblique cuts 32 may be made along the larger panel 36 in order to produce a smooth, multi-layered area of overlap 42 when the perimeter border area along each of the n sides of the larger panel are folded and adhesively secured to the perimeter border areas along the corresponding n sides of the smaller panel. These cuts eliminate the corners 34 of the larger panel and reduce bulk around the corners of the finished air bag. Once these cuts 32 are made and the corner sections of fabric defined by the cuts removed, the folded panel portions 30 along each of the n sides of the larger panel 36 are generally trapezoidal in shape. These n panel portions 30 may then be folded onto and adhesively secured to the corresponding n perimeter border areas 42 comprising the lapped portion of the smaller panel, thereby forming an adhesively secured seam that is capable of distributing the stresses of inflation and impact as shear stresses over the entire lapped area of the seam.

FIG. 7 shows a view of the smaller rear panel 40 of the octagonal air bag of FIG. 6 before the final trapezoidal-shaped panel portion 36 is folded in overlapping fashion and secured to the corresponding perimeter border area of the smaller panel 40. In a preferred embodiment, the lapped panel portions 32 would not face the driver when the air bag is deployed, thereby presenting a relatively smooth, unseamed surface to the driver. FIG. 7 again illustrates that removing the corner portions of the larger panel provides a smooth area of overlap with no excessive fabric in the corners of the finished air bag.

FIG. 8A shows a cross-sectional view of the air bag of FIG. 7, wherein substantially the entire width of the folded portion 30 of the perimeter border area of the larger panel is in contact with and secured to the corresponding perimeter border area of the smaller panel. An alternate embodiment is shown in FIG. 8B. In this embodiment, the fold width is depicted as the same, but the size of the smaller panel is such that the lapped area in which folded portion 30 is in contact with and secured to the perimeter border area of the smaller panel is reduced to an area nearest the outer edge of the folded portion 30. In FIGS. 8A and 8B, the folded panel portion 30 is depicted in an overlap configuration, i.e., panel portion 30 is folded over the upper side of the smaller panel 40. FIGS. 9 and 10 illustrate a configuration in which the folded panel portion 30 may be folded under the smaller panel and be secured to the underside of the smaller panel 40, thereby forming an underlapped seam. FIG. 9 indicates that such an air bag, when inflated, could have all seam edges associated with the rear panel, thereby providing a relatively smooth face panel. This is more clearly depicted in FIG. 10, which is a cross-section of the bag of FIG. 9. As can be seen, the folded panel portions 30 first overlap themselves (when folded) and are then adhesively secured to the underside of the smaller panel 40, which comprises the entire face of the air bag. In keeping with the teachings above, it should be noted that smaller panel 40 need not extend to cover the entire folded portion 30 of the larger panel, but may only extend so far as to present a lapped panel area in which a sufficiently strong adhesive bond can be established, in a manner analogous to the overlapped seam of FIG. 8B. It should also be noted that the use of cut-outs at the vertices of the larger polygonal panel are optional, and may be used with underlapped or overlapped seams.

Having described the principles of my invention in the form of the foregoing exemplary embodiments, it should be understood by those skilled in the art that the invention can be modified in arrangement and detail without departing from such principles, and that all such modifications falling within the spirit and scope of the following claims are intended to be protected hereunder.

I claim:

1. An inflatable cushion in the shape of an n-sided polygon for use in a vehicle occupant restraint system, said cushion having a front surface comprised of a first fabric polygon having n sides and associated perimeter border areas and a rear surface comprised of a second fabric polygon having n sides and associated perimeter border areas, where n is at least five and less than eleven and said fabric polygons are similarly shaped and of unequal size, said front surface and said rear surface being joined by a seam in which perimeter border areas of said first fabric polygon are lapped and joined by adhesive means to respective perimeter border areas of said second fabric polygon.

2. The cushion of claim 1 wherein said first and said second polygons are equiangular and n is six or eight.

3. The cushion of claim 2 wherein said polygons are regular polygons.

4. The cushion of claim 1 wherein the n sides of said first polygon are substantially parallel to respective n sides of said second polygon.

5. The cushion of claim 4 wherein the n sides comprising the larger of said fabric polygons extend a substantially uniform distance beyond the corresponding respective n sides of the smaller polygon, thereby providing a seam of substantially uniform width surrounding said smaller fabric polygon.

6. The cushion of claim 1 wherein at least a portion of the perimeter border areas of said larger of said fabric polygons overlaps the perimeter border areas of said smaller of said fabric polygons.

7. The cushion of claim 1 wherein at least a portion of the perimeter border areas of said larger of said fabric polygons underlaps the perimeter border areas of said smaller of said fabric polygons.

8. A process for constructing an inflatable cushion for use in a vehicle occupant restraint system, said cushion being comprised of two fabric panels of similar shape and unequal size, each panel having the shape of an n-sided polygon, n being at least five and less than eleven, and each panel further having a respective perimeter border area adjacent to each of said n sides, and wherein at least a portion of the perimeter border area of the larger of said two polygons is folded and secured to a respective perimeter border area of the smaller of said two polygons, said method comprising the steps of (a) cutting a first fabric panel in an n-sided polygon shape; (b) cutting a second, larger fabric panel in said n-sided polygon shape, (c) forming a lapped seam by folding and securing along each of said n sides of said first panel, in lapped relationship, at least a portion of said perimeter border area of said second panel to a respective perimeter border area of said first panel.

9. The process of claim 8 wherein said lapped seam is formed by overlapping said perimeter border area of said larger polygon onto said perimeter border area of said smaller polygon.

10. The process of claim 8 wherein said lapped seam is formed by underlapping said perimeter border area of said larger polygon onto said perimeter border area of said smaller polygon.

11. The process of claim 10 wherein, prior to said seam forming step, radial cuts are made in said first panel to remove corner segments of said first panel.

12. The process of claim 10 wherein said first and said second panels are cut in the shape of an equiangular n-sided polygon where n is six or eight.

13. The process of claim 10 wherein said first panel and said second panel are cut from different fabric blanks.

14. A process for constructing an inflatable cushion for use in a vehicle occupant restraint system, said cushion being comprised of two fabric panels of similar shape and unequal size, each panel having the shape of an n-sided polygon, n being at least five and less than eleven, and each panel further having a perimeter border area adjacent to each of its n sides, and wherein at least a portion of the perimeter border area of the larger of said two polygons is folded and secured, in lapped relationship, to a respective perimeter border area of the smaller of said two polygons, thereby forming a lapped seam, said method comprising the steps of (a) cutting a first fabric panel in an n-sided polygon shape; (b) cutting a second, larger fabric panel in said n-sided polygon shape, (c) superimposing said first and said second fabric panels in concentric relationship, with the respective n sides of said first panel being substantially parallel to the respective n sides of said second panel, thereby forming a layered structure in which the perimeter border area adjacent to each of the n sides of said second larger panel extend laterally beyond the corresponding n sides of said first panel; (d) folding and securing, in lapped relationship, at least a portion of said laterally extended perimeter border area along each of said n sides of said second, larger panel to respective perimeter border areas of said first panel.

15. The process of claim 14 in which said laterally extended perimeter border areas are secured by the application of an adhesive.

16. The process of claim 14 wherein said first panel and said second panel are cut from different fabric blanks.

17. The process of claim 14 wherein said first and said second fabric panels are cut in the shape of an equiangular n-sided polygon where n is six or eight.

\* \* \* \* \*